US009689765B2

(12) United States Patent
Lucas et al.

(10) Patent No.: US 9,689,765 B2
(45) Date of Patent: Jun. 27, 2017

(54) LIQUID METERING PUMP, AND DEVICE FOR DETECTING THE VARIATION IN PRESSURE FOR SUCH A PUMP

(75) Inventors: Gregory Lucas, Tresses (FR); David Vacher, Tresses (FR); Christophe Charriere, Tresses (FR)

(73) Assignee: DOSATRON INTERNATIONAL, Tresses (FR)

( * ) Notice: Subject to any disclaimer, the term of this patent is extended or adjusted under 35 U.S.C. 154(b) by 269 days.

(21) Appl. No.: 13/876,553

(22) PCT Filed: Sep. 28, 2011

(86) PCT No.: PCT/IB2011/054258
§ 371 (c)(1),
(2), (4) Date: Apr. 16, 2013

(87) PCT Pub. No.: WO2012/046162
PCT Pub. Date: Apr. 12, 2012

(65) Prior Publication Data
US 2013/0202456 A1 Aug. 8, 2013

(30) Foreign Application Priority Data

Oct. 8, 2010 (FR) ...................... 10 58175

(51) Int. Cl.
*G01L 7/08* (2006.01)
*F04B 9/105* (2006.01)
(Continued)

(52) U.S. Cl.
CPC .............. *G01L 7/084* (2013.01); *F04B 9/105* (2013.01); *F04B 13/02* (2013.01); *F04B 49/022* (2013.01);
(Continued)

(58) Field of Classification Search
CPC .................... F04B 49/022; F04B 9/105; F04B 2205/00–2205/503; F04B 53/00;
(Continued)

(56) References Cited

U.S. PATENT DOCUMENTS 3,100,997 A * 8/1963 Lorenz .................. G01L 9/0076
250/231.19
4,809,731 A 3/1989 Walton
(Continued)

FOREIGN PATENT DOCUMENTS

EP 0 885 357 12/1998
EP 0 915 256 5/1999
(Continued)

OTHER PUBLICATIONS

International Search Report dated Dec. 5, 2011, corresponding to PCT/IB2011/054258.

*Primary Examiner* — Theodore Stigell
*Assistant Examiner* — Chirag Jariwala
(74) *Attorney, Agent, or Firm* — Young & Thompson

(57) ABSTRACT

A liquid metering pump includes an intake nozzle (2) provided with an intake valve (3) communicating with a working chamber (4) in which a piston (5) can be moved in an alternating translation movement, suction being produced, with the intake valve open, when the piston moves away from the nozzle, and delivery being produced, with the intake valve closed and liquid emerging through an outlet valve, when the piston moves towards the nozzle. The pump includes, between the intake valve (3) and the working chamber (4), a device (D) for detecting the variation in pressure, the device (D) including a duct (10), which is connected at one end to the working chamber (4) and is provided at its other end with the intake valve (3), and an element (11) which is sensitive to the pressure in the duct, the element (11) being mounted in the wall of the duct.

7 Claims, 2 Drawing Sheets

(51) Int. Cl.
  *F04B 13/02* (2006.01)
  *F04B 49/02* (2006.01)
  *F04B 53/00* (2006.01)
(52) U.S. Cl.
  CPC .............. *F04B 53/00* (2013.01); *G01L 7/086* (2013.01); *F04B 2205/02* (2013.01)
(58) Field of Classification Search
  CPC .......... F04B 13/02; G01L 11/02; G01L 1/167; G01L 1/186; G01L 9/0032; G01L 9/0014; G01L 9/0039; G01L 9/0076; G01L 7/084; G01L 7/086
  USPC ............................... 417/63, 403, 417; 73/705
  See application file for complete search history.

(56) References Cited

U.S. PATENT DOCUMENTS

| | | | | |
|---|---|---|---|---|
| 5,055,008 | A * | 10/1991 | Daniels | F04B 13/02 417/403 |
| 5,505,224 | A | 4/1996 | Urrutia et al. | |
| 6,129,526 | A * | 10/2000 | Kelly | 417/403 |
| 6,171,253 | B1 * | 1/2001 | Bullister | A61B 5/0215 600/486 |
| 6,742,994 | B2 * | 6/2004 | Hironaka et al. | 417/63 |
| 6,820,490 | B2 * | 11/2004 | Mittelstein et al. | 73/715 |
| 7,207,260 | B2 | 4/2007 | Thierry et al. | |
| 7,305,887 | B2 * | 12/2007 | Jain | G01L 19/083 116/288 |
| 7,328,626 | B2 * | 2/2008 | Beller | F04B 49/065 417/44.2 |
| 8,520,215 | B2 * | 8/2013 | Rohacek | G01N 21/6408 356/496 |
| 2004/0187568 | A1 * | 9/2004 | Locatelli | B60C 23/0425 73/146.3 |

FOREIGN PATENT DOCUMENTS

| | | |
|---|---|---|
| FR | 2 707 350 | 1/1995 |
| FR | 2 847 950 | 6/2004 |
| WO | 97/33090 | 9/1997 |
| WO | WO2009/134181 * | 5/2009 |

\* cited by examiner

LIQUID METERING PUMP, AND DEVICE FOR DETECTING THE VARIATION IN PRESSURE FOR SUCH A PUMP

The invention relates to a liquid metering pump of the kind which comprise a suction nozzle fitted with an intake valve communicating with a working chamber in which a piston can be moved in a reciprocating movement, a suction being produced, with opening of the intake valve, when the piston moves away from the nozzle, and a delivery being produced, with closure of the intake valve and outlet of liquid through an outlet valve, when the piston moves closer to the nozzle.

Metering pumps of this kind are known, notably from FR 2 847 950 in the name of the Applicant Company.

Such pumps are satisfactory but it is desirable to obtain improved information regarding their operation, notably in order to be able to diagnose problems, such as the failure of a component of the pump, and collate data detailing how the pump is behaving, such as calculation of dosage in real time, the length of time for which the metering device has been in use, the consumption of chemical products, the number of breakdowns.

In order to address this problem, according to the invention, a liquid metering pump, of the kind defined hereinabove, is characterized in that it comprises, between the intake valve and the working chamber, a pressure-variation detection device comprising, on the one hand, a duct connected to one end of the working chamber and equipped at its other end with the intake valve and, on the other hand, a means sensitive to the pressure in the duct and mounted in the wall of the duct.

The means sensitive to the pressure in the duct may comprise a membrane installed on a portion of the wall of the duct and subjected to the pressure emanating from the working chamber, and a detection means detecting movements of the membrane resulting from variations in pressure.

Advantageously, the membrane is arranged in a cavity set back from the internal surface of the duct, the cavity communicating with the duct via a transverse orifice.

The means of detecting movements of the membrane may be a mechanical means, particularly consisting of a feeler, an optical sensor, actuated by a finger connected to the membrane.

As an alternative, the means of detecting movements of the membrane may comprise a displacement sensor of inductive type, particularly a Hall-effect sensor.

The means sensitive to the pressure in the duct may comprise a transducer, particularly a strain gauge mounted on the wall of the duct, to supply electric signals indicative of the pressure variations in the working chamber.

The means sensitive to the pressure in the duct is advantageously connected to means of exploiting the pressure variations detected in order to analyze the operation of the pump.

The means of exploiting the pressure variations may comprise electronic computation means which are programmed to determine various operating parameters, such as: to calculate dosage in real time, the time for which the metering device has been in use, the consumption of chemical product taken in, the number of breakdowns.

The exploitation means are also advantageously designed to visualize the cycles of the metering pump, to emit an alarm in the event of pumping ceasing, to detect a failure with the intake system and, as an option, to detect the end of a reserve of liquid from which intake is taking place.

For preference, the pressure-variation detection device is connected dissociably to the working chamber.

The invention also relates to a pressure-variation detection device for a pump as defined hereinabove, characterized in that it comprises, on the one hand, a duct that can be connected dissociably to one end of a working chamber of the pump and can be fitted at its other end with an intake valve and, on the other hand, a means sensitive to the pressure in the duct and mounted in the wall of the duct.

Apart from the provisions set out hereinabove, the invention consists in a certain number of other provisions that will be covered more fully hereinafter with regard to some exemplary embodiments which are described with reference to the attached but entirely nonlimiting drawings. In these drawings.

Figure 1:
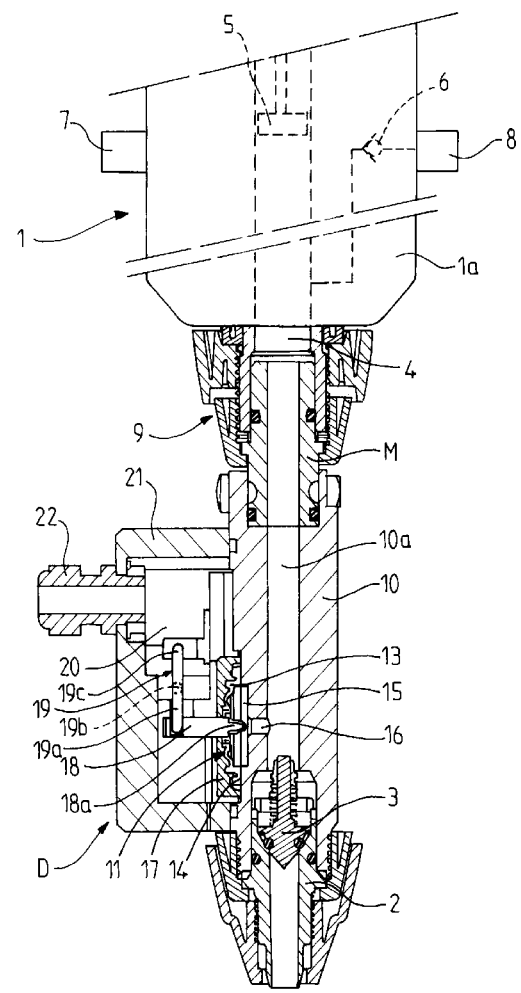
FIG. 1 is a partial depiction with parts shown in external view, of a metering pump according to the invention, the lower part of which is fitted with a pressure detecting device and depicted in vertical axial section.

Reference is made to the drawings, notably to FIG. 1 which shows a liquid metering pump 1 comprising an intake nozzle 2 with intake valve 3 communicating with a working chamber 4 only the lower part of which is visible in FIG. 1. A piston 5, depicted in no great detail, can be moved in a reciprocating translational movement in the working chamber; suction is produced with opening of the valve 3 when the piston 5 moves away from the nozzle 2, whereas delivery, with closure of the intake valve 3 and outlet of liquid through an outlet valve 6, is produced when the piston 5 moves closer to the nozzle 2.

The reciprocating translational movement of the piston 5 is advantageously brought about by a hydraulic motor (not depicted) included in the pump 1 and actuated by a pressurized liquid admitted to the pump 1 by an inlet orifice 7 provided on the body 1a of the pump. The body 1a is generally made of plastic, with a cap 1b (FIG. 3) attached dissociably, notably by screwing, to this body.

A liquid additive, contained in a container which has not been depicted, can be sucked up using a pipe (not depicted) immersed via one end in the liquid-additive container and connected at its other end to the intake nozzle 2. The liquid additive is mixed within the pump body 1a with the main liquid that enters via the orifice 7, and the metered mixture leaves via the outlet orifice 8 which is diammetrically opposite the orifice 7.

According to the prior art, the intake nozzle 2 is provided at the lower end of the working chamber 4, which is equipped with connection means 9, notably screw connection means, allowing the nozzle to be installed dissociably at the end of the chamber 4.

According to the invention, the metering pump 1 is equipped with a device D that detects the variation in pressure in the working chamber 4. This device D is installed between the intake valve 3 and the chamber 4. The device D comprises a duct 10 connected at one end to the chamber 4 via a sleeve M and the connecting means 9. The duct 10 is equipped at its other end with the intake valve 3 and with the nozzle 2.

The device D further comprises a means 11 sensitive to the pressure in the duct 10 and therefore to the pressure in the chamber 4 connected to this duct. Means (FIG. 3) of exploiting the detected pressure variations are advantageously provided and are connected to the means 11 sensitive to the pressure in order to analyze the operation of the pump.

According to the embodiment depicted in FIG. 1, the means 11 sensitive to the pressure comprises a flexible membrane 13 arranged in a fluidtight manner against the end wall 14 of a cavity provided in the cylindrical outer wall of the duct 10. The membrane 13 constitutes a deformable partition of a chamber 15 provided in the wall of the duct 10. The chamber 15 communicates via a transverse orifice 16 with the interior space 10a of the duct 10 in a region contained between the intake valve 3 and the means 9 of connection to the chamber 4. The pressure obtaining at the orifice 16 is substantially the same as the pressure obtaining in the chamber 4.

The membrane 13 is made of a flexible material, notably an elastomeric material, and is held against the end wall 14 by a cap 17 the internal profile of which matches the external profile of the membrane which has a peripheral roll. According to the embodiment depicted, the membrane 13 further comprises, on the opposite side to the interior space 10a, a circular rib situated radially on the inside of the peripheral roll.

The cap 17 comprises a central opening for the passage and guidance of a finger 18 the axis of which is orthogonal to the axis of the duct 10. That end of the finger 18 that faces towards the orifice 16 is produced in the form of a valve needle 18a covered by the membrane and able to enter the orifice 16 under the effect of a depression. In FIG. 1, the membrane 13 is depicted as pressed firmly against the cap 17, which corresponds to the maximum volume of the chamber 15 and to a phase of pressure in the chamber 4 and in the duct 10.

At its opposite end to the valve needle 18a, the finger 18 is able to act on a feeler 19, notably consisting of the rotary lever 19a of an optical sensor 20. The connection between the finger 18 and the feeler 19 is provided by an articulation. The rotary mounting of the lever 19a is effected by means of a pin 19b orthogonal to the plane of FIG. 1 and situated substantially mid-way along the length of the lever 19a and supported by a bearing provided in the optical sensor. That end 19c of the lever that is remote from the finger 18 can cross an optical beam of the sensor 20, depending on the position dictated by the finger 18, and thus trigger an electrical signal indicative of the position of the membrane 13.

The assembly comprising the cap 17, the finger 18 and the optical sensor 20 is held in a casing 21 itself fixed against the duct 10. The casing 21 comprises an end piece 22 to let out one or more cables (not depicted in FIG. 1) which are connected to the contact 20.

Figure 2:
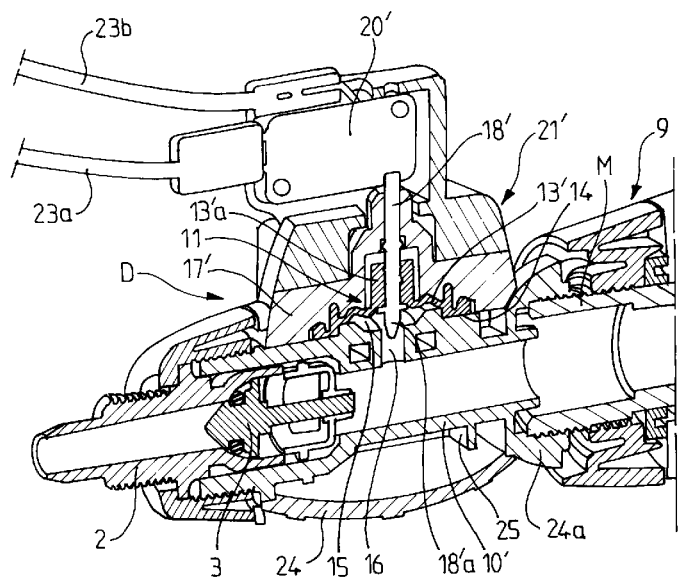
FIG. 2 is a perspective depiction in axial section, on a larger scale, of an alternative form of the detection device with its axis substantially horizontal.

Reference is made to FIG. 2 which depicts, substantially horizontally in axial section, an alternative form of embodiment of the detection device D for a metering pump according to the invention. Those elements of FIG. 2 that are identical to elements already described with reference to FIG. 1 are denoted by the same numerical references, possibly followed by an apostrophe ' when a modification has been made to that element. Identical elements are not described again.

The membrane 13' comprises, on the opposite side to the chamber 15, a cylindrical part 13'a projecting in a radial direction, which in a fluidtight manner surrounds a portion of the finger 18'. The valve needle 18'a forms the end of this finger that faces toward the duct 10a and projects into the chamber 15. The valve needle 18'a remains partially engaged in the orifice 16 when the membrane 13', as illustrated in FIG. 2, is pressed against the cap 17'. During an intake phase, the membrane 13' moves away from the cap 17' and is pressed firmly against the other wall of the chamber 15.

Figure 3:
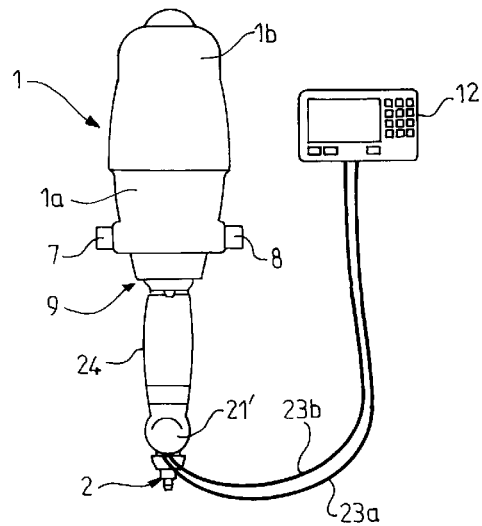
FIG. 3 is a general arrangement in side elevation, on a smaller scale, of a metering pump equipped with a detection device according to FIG. 2, with the exploitation means formed of an electronic computer.

Via its opposite end to the valve needle 18'a, the finger 18' can act on the feeler of an electrical contact 20' housed in a casing 21'. Two cables 23a, 23b lead out from the contact 20' to transmit the information in the form of electrical signals to exploitation means notably consisting of an electronic computer 12, as illustrated in FIG. 3.

A wall 24 substantially in the shape of an ellipsoid, the longitudinal axis of which coincides with that of the duct 10', surrounds this duct and is secured thereto by transverse partitions 25. The cap 17' is inserted into a housing in the wall 24 whereas the casing 21' covers the cap 17' and is dissociably attached to the wall 24. This wall, at its end furthest from the nozzle 2, comprises an internally threaded sleeve 24a which can be screwed onto an externally threaded end piece of the connecting means 9.

That being the case, the way a metering pump according to the invention works is as follows. This working is described with reference to FIG. 1, but the description immediately applies to the alternative form of FIG. 2.

During an intake phase of suction into the working chamber 4, a depression is created in the duct 10 and this causes the valve 3 to open and liquid to be sucked into the duct 10 and the chamber 4.

During this intake phase, the membrane 13 is subjected to a depression and moves to the right, according to the arrangement of FIG. 1, moving closer to the end wall of the cavity 15, or pressing against this end wall, depending on the strength of the depression. The finger 18 moves to the right with the membrane 13 and takes with it the feeler 19 of the optical sensor 20 which provides information in the form of an electrical signal indicating an intake phase.

When the piston 5 descends and delivers the liquid, the valve 3 closes whereas the outlet valve 6 opens. The pressure in the working chamber 4 increases, as well as in the duct 10, and the membrane 13 is pressed firmly against the cap 17, pushing the finger 18 to the left, as depicted in FIG. 1. The feeler 19 of the sensor 20 is made to move accordingly and a corresponding electrical signal is transmitted to the operation analysis means.

The optical sensor 20 may be of the on/off type. As an alternative, the optical sensor 20, or an equivalent detection means, could provide a signal, notably an analogue signal, the amplitude of which would be dependent on the displacement of the feeler 19 and, in particular, proportional to the displacement of the valve needle 18a.

The system for detecting the variation in pressure of the pump, according to the invention, connected under the working chamber 4 and above the intake valve 2 of the metering device, allows advantage to be derived from the following phenomena:

depression phase during intake;
pressure phase during delivery.

The invention allows the two successive phases to be in the operating cycle of the metering pump to be exploited in order to generate a mechanical translational movement of the push rod finger 18, 18'.

This result is achieved by interposing a membrane 13, 13' which is sufficiently sensitive and moves under the action of the depression and of the pressure and which generates the alternating translational movement of the finger 18, 18'. This movement is captured in order to create the electrical contact which will be of a mechanical nature in the example in question with the electrical contactors 20, 20', or which may as an alternative be of an inductive nature (using the Hall effect).

As an alternative, the pressure variation detector could consist of a strain gauge positioned against the external wall of the duct 10.

The detection system works even for low metering pump flow rates, at frequencies of around 0.003 Hz.

The operation of the detection system is fairly insensitive to the physical nature of the product being metered thanks to the membrane system (viscosity/laden products).

The choice of the materials used is matched to the chemical application and to the nature of the additive liquid being pumped by the metering device.

The range of pressures of the main liquid arriving via the inlet 7 and leaving via the outlet 8 may be from 0.05 to 6 bar.

The operating frequency of the pump may be from 0.003 Hz to 1.5 Hz.

The life may be as high as five million cycles.

The invention makes it possible to provide diagnostic information regarding the operation of the pumps by performing the following functions:
  visualizing the cycles of the metering pump;
  raising the alarm when the motor that drives the pump stops;
  detecting a failure of the intake system;
  as an option, detecting the end of a reserve containing the additive liquid pumped through the intake valve.

Thanks to the coupling to an electronic computer 12, the signals supplied by the detector can be interpreted in various forms and may provide access to a certain amount of information:
  for calculating the metering in real time;
  the time for which the metering device has been in use;
  the consumption of chemical product taken in through the intake valve;
  the number of breakdowns, if any, or other information regarding operation.

The pressure-variation detection device D may be fitted as original equipment to a new pump, or may easily be retrofitted to a pump already in service.

The invention claimed is:

1. A liquid metering pump comprising:
  a suction nozzle (2) fitted with an intake valve (3) communicating with a working chamber (4) in which a piston (5) can be moved in a reciprocating movement; and
  a pressure-variation detection device (D) that detects variations in pressure in the working chamber (4), the pressure-variation detection device (D) comprising a duct (10, 10') located between the intake valve (3) and the working chamber (4), the duct (10, 10') comprising a wall with an internal surface and an external surface, a first end of the duct connected to one end of the working chamber (4) and a second end of the duct equipped with the intake valve (3),
  wherein, when the piston (5) moves away from the suction nozzle (2), a suction is produced, with opening of the intake valve (3), and a liquid entering through the suction nozzle (2) is delivered to the working chamber (4) via the duct (10, 10'),
  wherein, when the piston moves closer to the suction nozzle (2), with closure of the intake valve (3), the liquid delivered to the working chamber (4) via the duct (10, 10') leaves the working chamber (4) through an outlet valve (6), and
  wherein, the pressure-variation detection device (D) further comprises
  i) a membrane (13) installed fluidtight against an end wall (14) of a cavity provided in the external surface of the wall of the duct (10, 10'), the membrane (13) being subjected to the pressure emanating from the working chamber (4) via an orifice (16) extending from the internal surface of the wall to the external surface of the wall of the duct, the membrane being held in place by a cap (17) and constituting a deformable partition of a chamber (15) provided in the wall of the duct, and
  ii) a detection means (18, 19, 20; 18', 20') detecting movements of the membrane resulting from variations in pressure within the working chamber (4), including detecting displacement of the membrane,
  wherein the detection means is a mechanical means comprising an optical sensor (20), a rotary lever (19) with a first end (19c) that moves to cross an optical beam of the optical sensor and thereby trigger an electrical signal, and a finger (18) with a first end that passes through the cap (17) and an opposite second end that is connected to the membrane, wherein the first end of the finger is connected to a second end of the rotary lever (19) by an articulation such that movement of the membrane moves the first end of the finger to actuate the optical sensor by causing rotary movement of the rotary lever, the rotary movement of the rotary lever triggers the optical sensor by causing the first end (19c) of the rotary lever to cross the optical beam of the optical sensor and thereby trigger the electrical signal.

2. The pump as claimed in claim 1, wherein the pressure-variation detection device (D) is connected dissociably to the working chamber (4).

3. The pump as claimed in claim 1, wherein the duct (10, 10') is connected dissociably to one end of the working chamber (4) of the pump and is fitted at another end with the intake valve (3), and wherein the membrane is mounted on the wall of the duct (10, 10').

4. The pump as claimed in claim 1, wherein the pressure-variation detection device is connected to an electronic computer for exploiting the pressure variations detected in order to analyze an operation of the pump.

5. The pump as claimed in claim 4, wherein the electronic computer (12) is programmed to determine operating parameters from the group consisting of
  i) calculation of dosage in real time,
  ii) calculation of a time for which the metering device has been in use,
  iii) calculation of consumption of chemical product, and
  iv) calculation of a number of breakdowns.

6. A liquid metering pump comprising:
  a suction nozzle fitted with an intake valve communicating with a working chamber in which a piston can be moved in a reciprocating movement, i) a suction being produced, with opening of the intake valve, when the piston moves away from the suction nozzle, and ii) a delivery being produced, with closure of the intake valve and discharge of a liquid in the working chamber through an outlet valve, when the piston moves closer to the suction nozzle, and
  a pressure-variation detection device (D) that detects variations in pressure in the working chamber, the pressure-variation detection device (D) being located between the intake valve and the working chamber, the pressure variation detection device (D) comprising:

i) a duct comprising a wall with an internal surface, a first end of the duct connected to one end of the working chamber and a second end of the duct equipped with the intake valve, and
ii) a means sensitive to the pressure of the fluid in the duct, the means sensitive to the pressure of the liquid in the duct being mounted on the wall of the duct,
wherein the means (11) sensitive to the pressure of the liquid in the duct comprises a membrane (13') installed on an exterior portion of the wall of the duct (10') that defines a chamber (15), and subjected to the pressure emanating from the working chamber (4), the membrane being leaktight held in place by a cap (17'), and a detection means detecting movements of the membrane resulting from variations in the pressure in the working chamber (4), including detecting displacement of the membrane, and
wherein the detection means is a mechanical means comprising an inductive displacement sensor (20') having a feeler, and a finger (18') with a first end (18') that passes through the cap (17') and an opposite second end (18'a) that is connected to the membrane and partially engages in an orifice (16) of the wall of the duct when the membrane is pressed against the cap (17'), and during an intake phase, the membrane (13') moves away from the cap (17') and is pressed against a wall of the chamber (15), and
wherein the first end of the finger is connected to the feeler of the inductive displacement sensor such that the feeler is actuated by movement of the membrane causing movement of the finger, and the movement of the feeler triggers the inductive displacement sensor.

7. The pump as claimed in claim 6, wherein the detection means detecting movements of the membrane comprises a Hall-effect sensor.

* * * * *